3,743,560
METHOD OF FORMING OPTICAL IMAGE TRANSMITTING DEVICES

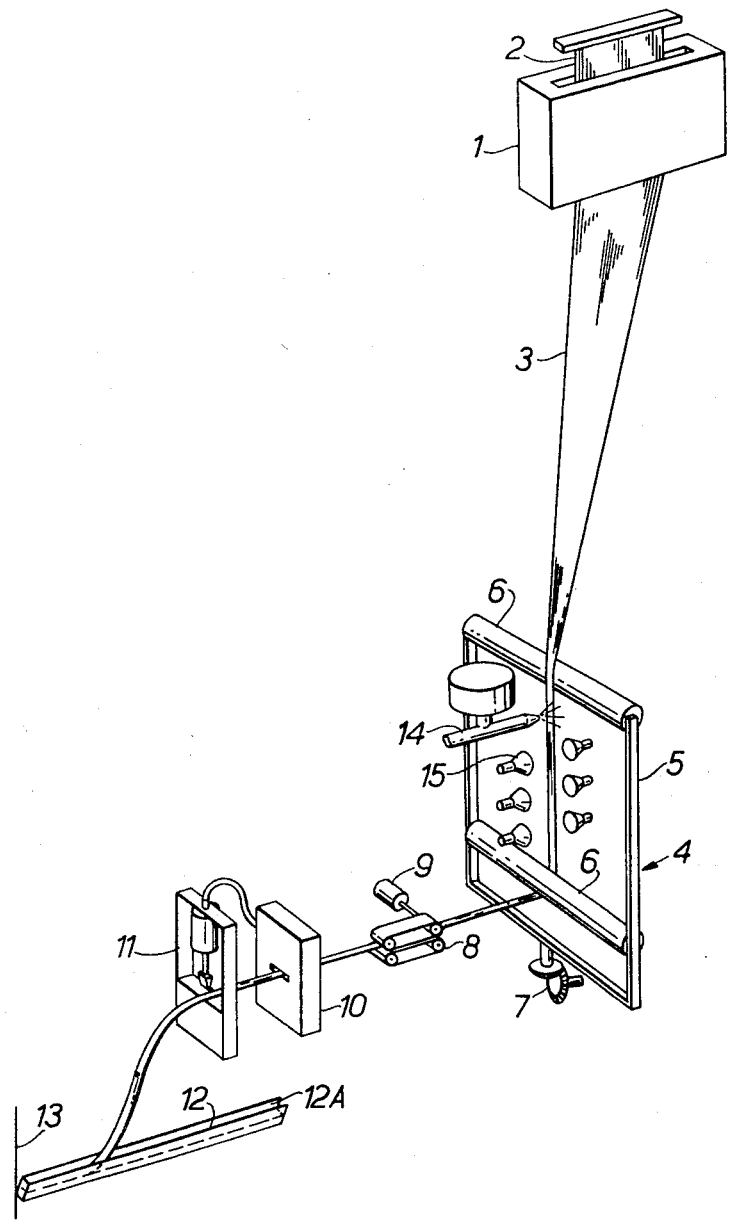

Michael Christopher Ian Western, Leeds, England, assignor to The Rank Organisation Limited, London, England
Filed May 7, 1971, Ser. No. 141,116
Claims priority, application Great Britain, May 7, 1970, 22,139/70
Int. Cl. B29h 9/04
U.S. Cl. 156—181                                    12 Claims

ABSTRACT OF THE DISCLOSURE

An image transmitting device is made by bringing together several separate optical fibres to form a flat tape. The tape is cut into separate lengths after the fibres have been caused to adhere to one another. The lengths are stacked and the ends at least of the stacked tapes bonded together. Apparatus for making the image transmitting device incorporates a device for bringing individual fibres together to form a tape, means for cutting the tape into lengths and means such as a channel in which the cut lengths of tape are stacked.

---

This invention relates to optical image transmitting devices and particularly to devices consisting of bundles of optical fibres. An object of the present invention is to provide a method of forming bundles of optical fibres which is an improvement on the method heretofore employed.

The present known method of forming bundles of optical fibres providing a high resolution consists in winding a single optical fibre on a drum to form at least one closely wound layer, applying an adhesive across a portion of the layer to bond the abutting convolutions together, cutting the cylinder of fibres into separate ring portions, stacking the bonded portions of several ring portions one on top of the other and bonding all these bonded portions into a block and cutting through the block to sever simultaneously all the ring portions.

The known method suffers from the disadvantage that as the fibre is wound as a single fibre onto the drum the time taken to make a complete bundle is considerable. In practice, it takes almost an hour to perform the winding operation followed by a further three hours at least for cutting, inspecting and stacking the loops.

The task to be performed is thus to provide a means of forming a bundle of optical fibres which is much less time-consuming.

According to the invention a method of producing a bundle of optical fibres as an image transmitting device includes the steps of bringing the separate optical fibres together as a flat tape, applying adhesive to cause the fibres to adhere to one another, cutting the tape into separate lengths, stacking a number of the lengths of tape one on top of the other, and bonding together the lengths of tape at the ends at least.

The tape may be the thickness of a single fibre or of several fibres.

The method may include the step of measuring the width of the tape at the position where the tape is to be cut, the cutting operation being performed only if the width of the tape lies between predetermined limits.

The bonded ends of the formed bundle may be ground and polished.

Apparatus for performing the method may include a tape-forming device arranged to receive several separate fibres simultaneously and bring the fibres together into a tape, means for bonding together the fibres constituting the tape, means for feeding the tape, means for sensing the length of tape fed forwardly, guillotine means coupled to said length-sensing means and operable to perform a cutting operation on a tape fed through the guillotine when a chosen length of tape has been fed, means for stacking cut lengths of tape and means for bonding the ends at least of each stack of tape lengths.

The apparatus may include means for sensing the width of the tape at the guillotine, said width-sensing means being so linked to the guillotine that the guillotine is permitted to operate only if the width of the tape lies between predetermined limits.

The tape-forming device may consist of a frame carrying at least two rollers around which fibres being brought together to form a tape are led. The frame may be so mounted that it is rotatable about an axis which intersects the axes of the rollers.

The means for feeding the tape may be two endless belts so arranged that a flight of one belt is parallel and so placed with relation to a flight of the other belt, that a thin object can be gripped between the belts, at least one of the belts being drivingly connected to a driving means. The driving means may be adjustable to provide a variable speed of driving the associated belt to vary the rate of feed of the tape.

The means for stacking cut lengths of tape may consist of a channel which is preferably tilted about its long axis so that the inner surface of the flange at the lower level acts as a gauge for one side of the stack being formed. Means may be provided for clamping a stack of tapes in the channel and for applying adhesive to the ends of the stack while it is held in the channel.

Means may be provided for entraining the leading ends of the fibres as they initially drop from the billets and leading them to the feeding means.

A practical embodiment of the invention is illustrated semi-diagrammatically in the accompanying drawing in which 1 denotes a furnace, 2 denotes billets of fibre-forming material being fed into the furnace, 3 denotes formed fibres leaving the furnace and 4 denotes a tape-forming device consisting of a frame 5 carrying rollers 6, the frame 5 being rotatable about an axis intersecting the axes of the rollers 6 by means of a bevel gear 7. The disposition of the rollers 6 and the orientation of the frame 5 cause the fibres 3 to be brought together to form a tape. 8 denotes tape-feeding means in the form of endless belts so disposed that adjacent flights on the belts are disposed close together to provide a nip in which the tape is entrained. 9 denotes a variable speed driving means for the belts. 10 denotes a tape width-sensing means operatively linked to a guillotine 11 through which the tape is fed after leaving the width-sensing means 10. The guillotine is set to operate at regular predetermined intervals of time so that the length of tape cut is dependent on the operaing speed of the driving means 9. The tape width-sensing means 10 is operative to inhibit operation of the guillotine 11 when it detects a portion of tape having a width outside a permissible width tolerance. 12 denotes a channel constituting tape stacking means, the channel 12 being tilted sideways from the vertical position indicated by the line 13 so that the flange 12A, at a level lower than that of the other flange of the channel 12, acts as a gauge for tapes deposited in a stack in the channel 12. 14 denotes spraying means operative to apply a spray of adhesive to the as yet unconnected fibres and 15 denotes infrared heaters provided to dry adhesive applied to the fibres by the spraying means 14.

In practice, billets 2 enter the furnace 1 and their melted ends issue as fibres 3 which, in passing around the rollers 6 of the tape forming device 4 come together to form a tape which is sprayed with adhesive by the spraying means 14, the adhesive being dried by the heaters 15 so that the separate fibres cannot come apart after the tape leaves the tape-forming device 4. The feeding means 8 receives the tape and feeds it through the tape width-sensing means 10 and the guillotine 11. As each predetermined length of tape as determined by the operating frequency of the guillotine 11 and the speed of the driving means 9 is cut off it is deposited in the channel 12 and when the desired height is attained indicating a certain number of layers the ends of the stack of tapes are coated with adhesive after which the ends are ground and polished. If the width of the tape goes outside of a predetermined width tolerance at any point the tape width-sensing device operates to inhibit operation of the guillotine so that the faulty piece of tape is not cut to length.

The complete width of a bundle is formed at one time and thus the time taken to make a stack is only that necessary to form the required number of layers. The total time to form a bundle of any specific size is consequently much less than that required to form a bundle of the same size by the known method in which the bundle is formed from successive portion of the same fibre. In addition the intermediate step of fitting the ring portions to one another is eliminated. The time ratio in producing a bundle between the method of the invention and the known method is as much as one minute to several hours.

What is claimed is:

1. A method of producing a bundle of optical fibres as an image transmitting device including the steps of forming simultaneously a plurality of separate optical fibres, then bringing the separate optical fibres together as a flat tape, applying adhesive to cause the fibres to adhere to one another, cutting the tape into separate lengths, stacking a number of the lengths of tape one on top of the other, and bonding together at least the ends of said lengths of tape.

2. The method claimed in claim 1 in which the tape is of the thickness of a single fibre.

3. The method claimed in claim 1 in which the tape is of the thickness of several fibres.

4. The method claimed in claim 1 including the step of measuring the width of the tape at the position where the tape is to be cut and performing the cutting operation only when the width of the tape lies between predetermined limits.

5. Apparatus for producing a bundle of optical fibres including a tape-forming device arranged to receive several separate fibres simultaneously and bring the fibres together into a tape, means for bonding together the fibres constituting the tape, means for feeding the tape, means for sensing the length of tape fed forwardly, guillotine means coupled to said length-sensing means and operable to perform a cutting operation on a tape fed through the guillotine when a chosen length of tape has been fed, means for stacking cut lengths of the tape, and means for bonding the ends at least of each stack of tape lengths.

6. Apparatus as claimed in claim 5 including means for sensing the width of the tape at the guillotine, said width-sensing means being operatively linked to the guillotine so that the guillotine is permitted to operate only if the width of the tape lies between predetermined limits.

7. Apparatus as claimed in claim 5 in which the tape-forming device consists of a frame, and rollers carried by the frame, the arrangement being such as to permit fibres to be led over the rollers and brought together to form a tape.

8. Apparatus as claimed in claim 7 in which the frame is so mounted that it is rotatable about an axis which intersects the axes of the rollers.

9. Apparatus as claimed in claim 5 in which the means for feeding the tape includes two endless belts so arranged that a flight of one belt is parallel and so disposed with relation to a flight of the other belt that a thin object can be gripped between the belts and driving means connected to at least one of the belts.

10. Apparatus as claimed in claim 5 in which the means for stacking cut lengths of tape consists of a channel having flanges, the channel being tilted about its longitudinal axis so that the flanges project upwardly and the inner surface of the flange at the lower level acts as a gauge for one side of a stack being formed within the channel.

11. Apparatus as claimed in claim 10 including means for clamping a stack of tapes in the channel and means for applying adhesive to the ends of the stack while it is held in the channel.

12. Apparatus as claimed in claim 5 including a furnace arranged to receive several billets of fibre material and means for feeding billets into the furnace.

References Cited

UNITED STATES PATENTS

| | | | |
|---|---|---|---|
| 3,033,731 | 5/1962 | Cole | 156—250 |
| 3,580,775 | 5/1971 | Siegmund | 156—181 |
| 3,586,562 | 6/1971 | Jones | 156—181 |
| 3,391,050 | 7/1968 | Nebesar | 156—181 |

DAVID KLEIN, Primary Examiner

JOHN L. GOODROW, Assistant Examiner

U.S. Cl. X.R.

65—4 DIG. R; 156—250